(12) United States Patent
Hidam et al.

(10) Patent No.: US 12,679,031 B2
(45) Date of Patent: Jul. 14, 2026

(54) MODULAR STORAGE DEVICE AND FILAMENT OUTLET

(71) Applicants: JF POLYMERS (SUZHOU) CO., LTD., Suzhou (CN); Techno Force (HK) Limited, HK. (CN)

(72) Inventors: Gavein Hidam, Suzhou (CN); Xiaofan Luo, Suzhou (CN); Tongyue Yu, Suzhou (CN); Yuli Huang, Suzhou (CN); Cong Zhao, Suzhou (CN); Xingyu Wei, Suzhou (CN); KinChi Yeung, Suzhou (CN)

(73) Assignees: JF POLYMERS (SUZHOU) CO., LTD., Suzhou (CN); Techno Force (HK) Limited, HK (CN)

( * ) Notice: Subject to any disclaimer, the term of this patent is extended or adjusted under 35 U.S.C. 154(b) by 103 days.

(21) Appl. No.: 18/731,313

(22) Filed: Jun. 2, 2024

(65) Prior Publication Data

US 2025/0144878 A1 May 8, 2025

(30) Foreign Application Priority Data

Nov. 2, 2023 (CN) .......................... 202330714083.0
Nov. 2, 2023 (CN) .......................... 202330714090.0
Nov. 2, 2023 (CN) .......................... 202330714099.1

(51) Int. Cl.
| | |
|---|---|
| *B29C 64/255* | (2017.01) |
| *B29B 13/06* | (2006.01) |
| *B29C 64/314* | (2017.01) |
| *B29C 64/321* | (2017.01) |
| *B33Y 40/10* | (2020.01) |

(52) U.S. Cl.
CPC ............ *B29C 64/255* (2017.08); *B29B 13/06* (2013.01); *B29C 64/314* (2017.08); *B29C 64/321* (2017.08); *B33Y 40/10* (2020.01)

(58) Field of Classification Search
CPC ... B29C 64/255; B29C 64/314; B29C 64/321; B29B 13/06; B33Y 40/10; B33Y 40/00
See application file for complete search history.

(56) References Cited

U.S. PATENT DOCUMENTS

| | | | |
|---|---|---|---|
| 2004/0129823 A1 | 7/2004 | Swanson et al. | |
| 2010/0096489 A1* | 4/2010 | Taatjes | B29C 64/118 242/520 |
| 2011/0076495 A1* | 3/2011 | Batchelder | D01D 5/42 264/145 |
| 2020/0086560 A1 | 3/2020 | Blair | |
| 2020/0307070 A1* | 10/2020 | Swanson | B29C 64/118 |

(Continued)

*Primary Examiner* — Michael M. Robinson
(74) *Attorney, Agent, or Firm* — FIDELI LAW PLLC; Qiang Li

(57) ABSTRACT

A modular storage device is provided. The modular storage device includes a housing configured to store a target object and separate the internal space of the housing from the external environment. The sidewall of the housing includes a first air outlet and a first air inlet. The first air outlet is configured to be coupled with an independent drying unit to allow the drying unit to expel the internal air of the internal space. The first air inlet is configured to be coupled with the drying unit to allow the drying unit to introduce external air into the internal space. This modular storage device enables the separation of storage and drying of target objects to accommodate different application scenarios.

22 Claims, 5 Drawing Sheets

(56) References Cited

U.S. PATENT DOCUMENTS

| | | | |
|---|---|---|---|
| 2022/0288859 A1* | 9/2022 | Schiel | B33Y 40/00 |
| 2023/0085743 A1* | 3/2023 | You | B29C 64/295 |
| | | | 425/74 |
| 2024/0009920 A1* | 1/2024 | Anderson | B29C 64/118 |

* cited by examiner

MODULAR STORAGE DEVICE AND FILAMENT OUTLET

RELATED DISCLOSURES

This application claims the benefit of the filing date of the following Chinese application numbers: CN 2023307140830, filed on Nov. 2, 2023; CN 2023307140900, filed on Nov. 2, 2023; and CN 2023307140991, filed on Nov. 2, 2023; the contents of the foregoing documents are incorporated herein by reference in the entirety.

COPYRIGHT NOTICE

TECHNICAL FIELD

This disclosure relates to the field of 3D printing technology, particularly to a storage device and filament outlet.

BACKGROUND 3D printing is a form of rapid prototyping technology. Fused filament deposition molding technology is one of the mainstream forms of 3D printing technology. This technology requires the use of 3D printing filaments. 3D printing filaments mainly include pure resin-based filaments, short fiber-reinforced resin-based filaments, and continuous fiber-reinforced resin-based filaments. Due to the inherent moisture-absorbing nature of 3D printing filaments, excessive moisture content in the filaments may lead to bubbles during the printing process when the filaments are melted, which may even lead to failure of normal printing and molding. Therefore, maintaining low moisture content in 3D printing filaments has become one of the crucial factors for improving the quality of 3D printed products.

3D printing filaments are typically stored in closed 3D printing filament boxes to maintain low moisture content. By incorporating a drying device within the box, the filaments within may be dried, ensuring their dryness to a certain extent. Drying devices and filament storage boxes are often designed as an integrated unit. Such a design necessitates equipping each filament storage box with a dedicated drying device, resulting in higher costs and challenges in adapting to various application scenarios.

SUMMARY

This disclosure provides a storage device for target objects (such as 3D printing filaments), in which storage and drying units of the target objects are designed in a modular way. This allows a single drying unit to be adaptable to multiple storage units, enabling dehumidification of the target objects in multiple storage units.

According to a first aspect of the present disclosure, a modular storage device is provided, including a storage unit, where the storage unit includes: a housing, configured to store a target object; and a lid, detachably and hermetically connected to the box body, where the housing includes a plurality of sidewalls, and at least one of the plurality of sidewalls includes a first air outlet and a first air inlet port, the first air outlet is configured to couple with an independent drying unit to allow the drying unit to withdrawal internal air from the internal space, and the first air inlet is configured to couple with the drying unit to allow the drying unit to introduce external air into the internal space.

According to a second aspect of the present disclosure, a modular storage device is provided, including: a drying unit, including: a second air outlet port, configured to be coupled with a first air inlet of a housing of an independent housing, a second air inlet port, configured to be coupled with a first air outlet of the housing, and an air-blowing module, configured to draw internal air from the housing through the second air inlet port, and inject external air into the housing through the second air outlet port, where a second relative humidity of the external air is lower than a first relative humidity of the internal air.

BRIEF DESCRIPTION OF THE DRAWINGS

In order to more clearly illustrate the technical solutions adapted in the present disclosure, the following will briefly introduce in the drawings of the present disclosure. Clearly, the drawings described below are only some examples of this specification, and ordinary skilled artisans in this field may obtain other drawings based on these drawings without inventive effort.

DETAILED DESCRIPTION

Figures 1, 2:
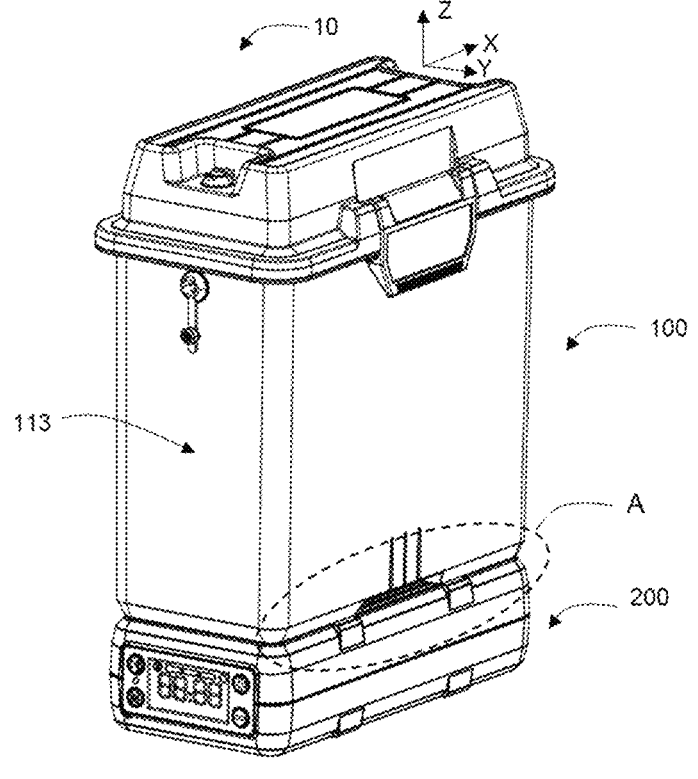
FIG. 1 illustrates a schematic diagram of the structure of a modular storage device according to some exemplary embodiments of this disclosure.
FIG. 2 illustrates a schematic diagram of air circulation within the modular storage device according to some exemplary embodiments of the present disclosure.

The following description provides specific scenarios and requirements of this specification, aiming to enable those skilled in the art to make and use the contents of this specification. For those skilled in the art, various local modifications to the disclosed embodiments are apparent, and without departing from the spirit and scope of this disclosure, the general principles defined herein may be applied to other embodiments and disclosures. Therefore, this disclosure is not limited to the illustrated embodiments but encompasses the broadest scope consistent with the claims.

The terms used here are solely for the purpose of describing specific exemplary embodiments and are not restrictive. For instance, unless context clearly indicates otherwise, the singular forms "a," "an," and "the" may also include plural forms. When used in this specification, the terms "comprising," "including," and/or "having" mean that the associated integers, steps, operations, elements, and/or components are present, but do not preclude one or more other features, integers, steps, operations, elements, components, and/or groups from being present or from being added to the system/method.

In this disclosure, the expression "X includes at least one of A, B, or C" means X includes at least A, or X includes at least B, or X includes at least C. In other words, X may include any combination of A, B, and C, or any combination of A, B, C, and other possible contents/elements. The arbitrary combination of A, B, and C may be A, B, C, AB, AC, BC, or ABC.

In this disclosure, unless explicitly stated, the structural relationships between structures may be direct or indirect. For example, when describing "A is connected to B," unless explicitly stated that A is directly connected to B, it should be understood that A may be directly connected to B or indirectly connected to B. Similarly, when describing "A is above B," unless explicitly stated that A is directly above B (A and B are adjacent, and A is above B), it should be understood that A may be directly above B or indirectly above B (A is above B but with other elements therebetween). The same applies to other similar descriptions.

For convenience in description, it is necessary to define "vertical direction" in this disclosure. The vertical direction refers to the direction perpendicular to the ground plane when an object is placed on the ground. For example, in FIG. 1, the vertical direction corresponds to the direction of the z-axis. Upward is the positive direction of z-axis, and downward is the direction opposite to the positive direction of z-axis. Similarly, terms like "up," "above," "upper," as well as "down," "below," "lower" are all referenced to the z-axis, where the positive direction of the z-axis is considered as up and the opposite direction thereof is considered as down.

Considering the following description, these features of the specification and other features, as well as the operations and functions of related components of the structure, and the economy of component combinations and manufacturing, may be significantly improved. The description also includes all graphics and text in the referenced drawings in this specification, and all of these form part of this specification. However, it should be clearly understood that the drawings are for illustrative and descriptive purposes and are not intended to limit the scope of this specification. It should also be understood that the drawings are not drawn to scale.

FIG. 1 illustrates a modular storage device according to some exemplary embodiments of this disclosure. In the storage device, a storage unit for storing objects and a drying unit for drying the objects are designed in a modular and detachable manner. This modular storage device may be applied in the field of 3D printing as well as in other fields, such as industrial, daily use, medical, and agricultural fields. For example, in 3D printing field, the target objects may be spools of 3D printing filaments or other types of filaments. In other fields, the target objects may also be any objects that need to be stored in specific humidity (or dryness) conditions, such as raw materials, clothing, medications, fruits, vegetables, books, etc. For purpose of convenient illustration, filament spools having filaments coiled thereon are used as an example of the target objects in the subsequent description.

In FIG. 1, the modular storage device 10 may include a storage unit 100 (i.e., storage chamber) and a drying unit 200. During usage, the storage unit 100 and the drying unit 200 are independent from each other and may be assembled together in a detachable manner. In other words, the storage unit 100 may function as the smallest unit for storing filament spools, or it may also be used as an independent module and assembled with another independent module drying unit 200 to actively dry the filaments coiled on the spool while keeping the filament spool stored in the storage unit 100. The same drying unit 200 may be adapted to multiple storage units 100 so as to dry or moisturize the target objects in the multiple storage units 100. For example, in a 3D printing scenario, the target object may be a 3D printing filament spool.

FIG. 2 illustrates an airflow circulation diagram inside the modular storage device 10 according to some exemplary embodiments of this disclosure. The drying unit 200 has power to export internal air from the storage unit 100 (storage chamber), adjust its humidity, and reintroduce the air back into the storage unit 100. The air outside the storage unit 100 (i.e., external air) flowing through the drying unit 200 has a humidity difference compared to the internal air exported from the storage unit 100 (storage chamber). The internal air exported from the storage unit 100 has the first relative humidity, while the external air flowing through the drying unit 200 has the second relative humidity.

The storage device 10 may be used to regulate the relative humidity inside the storage unit 100. When the second relative humidity is higher than the first relative humidity, the drying unit 200 may export the dry internal air from the storage unit 100 and introduce humid external air to the storage unit 100; when the second relative humidity is lower than the first relative humidity, the drying unit 200 may export the humid internal air from the storage unit 100 and introduce dry external air to the storage unit 100. In the context of 3D printing, the primary role of this modular storage device 10 is to maintain the dryness of 3D printing filaments.

Figure 3:
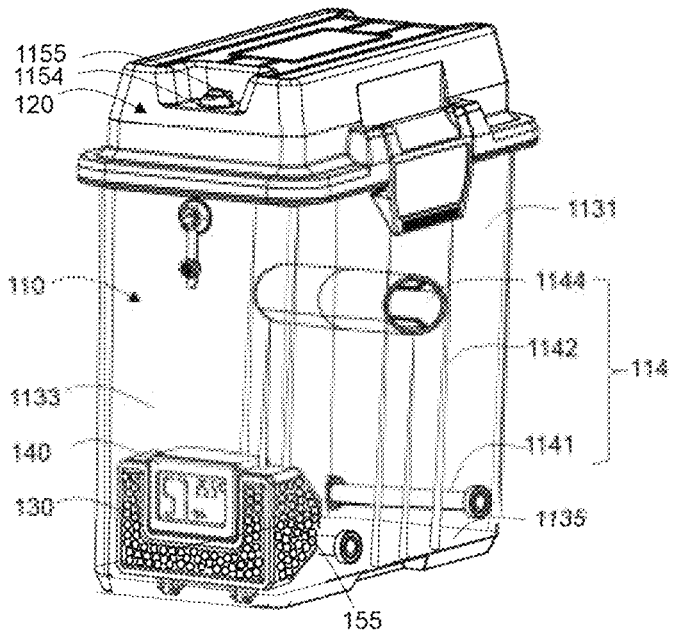
FIG. 3 illustrates a structural schematic diagram of a storage unit in the storage device of FIG. 1 from a first perspective.
Figure 4:
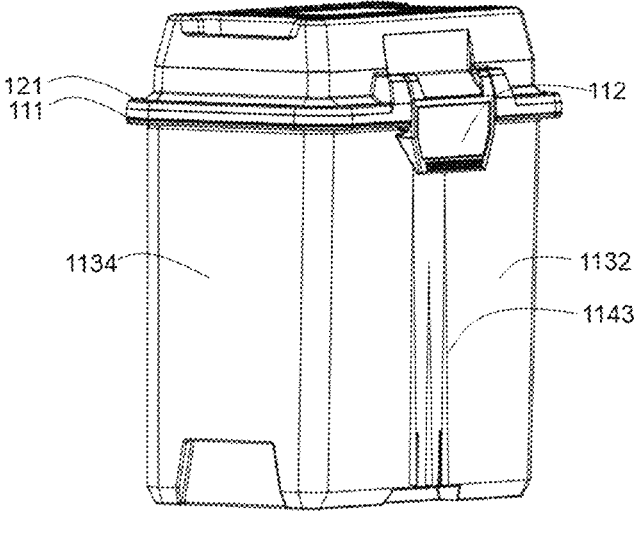
FIG. 4 illustrates a structural schematic diagram of a storage unit in the storage device of FIG. 1 from a second perspective to display different sides of the storage unit.

FIG. 3 illustrates the structure of the storage unit 100 from a first perspective, while FIG. 4 shows the structure of the storage unit from a second perspective to display different sides of the storage unit 100. The first perspective is opposite to the second perspective. The storage unit 100 may include a housing 110, a lid 120, color-changing desiccant 130, and a humidity sensor 140.

The housing 110 and the lid 120 may be coupled together through various manners of detachable and hermetic connection, such as threaded connection, snap connection, or hinge-snap combination connection, and so on. Through these detachable and hermetic connection manners, the lid 120 may be removed from the housing 110, facilitating the insertion or removal of the filament spool. For instance, when the lid 120 is placed over the housing 110, it may be detachably connected to the housing 110 using snap connection. As shown in FIG. 3, the lid 120 is equipped with a first snap edge 121, while the housing 110 has a second snap edge 111, with snap locks 112 located on both sides of the housing 110. When the lid 120 is placed over the housing 110, the first snap edge 121 rests on the second snap edge 111, and the connection between the housing 110 and the lid 120 is secured by closing the snap locks 112. It should be noted that the snap locks 112 may be located on the housing 110, the lid 120, or on both of the housing 110 and the lid 120.

A sealing groove (not shown) having a sealing element therein is provided within the first snap edge 121 to achieve sealing of the storage unit 100. The sealing element may be a sealing ring, sealing adhesive, soft filler, etc. When the housing 110 and the lid 120 are connected through the first snap edge 121 and the second snap edge 111, the sealing element within the sealing groove seals the gap formed between the housing 110 and the lid 120, effectively isolating the internal space of the storage unit 100 from the external environment and preventing impurities and moisture from entering the storage unit 100.

The housing 110 may take various shapes, such as cylindrical or polygonal shapes. In each shape, the housing 110 may include one or more sidewalls 113. For instance, in FIGS. 3 and 4, the storage unit 100 is a hexahedron. Accordingly, the sidewalls 113 may include a first sidewall 1131, a second sidewall 1132, a third sidewall 1133, a fourth sidewall 1134, and a bottom 1135. Here, the first sidewall 1131 is set opposite to the second sidewall 1132, and the third sidewall 1133 is set opposite to the fourth sidewall 1134. It should be noted that the housing 110 may be modular or monolithic in design.

The internal space is formed when the lid 120 covers the housing 110. This internal space is used to store filament spools (target objects) in a hermetic/sealed manner, maintaining the dryness of the target objects over a certain period. It's worth mentioning that the sealing of the internal space is relative. In other words, tiny gaps exist that allow moisture molecules from the external environment to slowly infiltrate the storage unit 100. When the moisture content of the external air entering the internal space reaches a certain level, active drying is needed for the drying unit 200 needs to maintain the dryness of the internal space. Here, the degree of dryness indicates the amount of moisture contained in the air in the internal space. The more moisture, the lower the dryness, and the less moisture, the higher the dryness. That is to say, the degree of dryness can indicate the degree of dryness of the internal space, and can also indicate the degree of humidity of the internal space.

Figure 5:
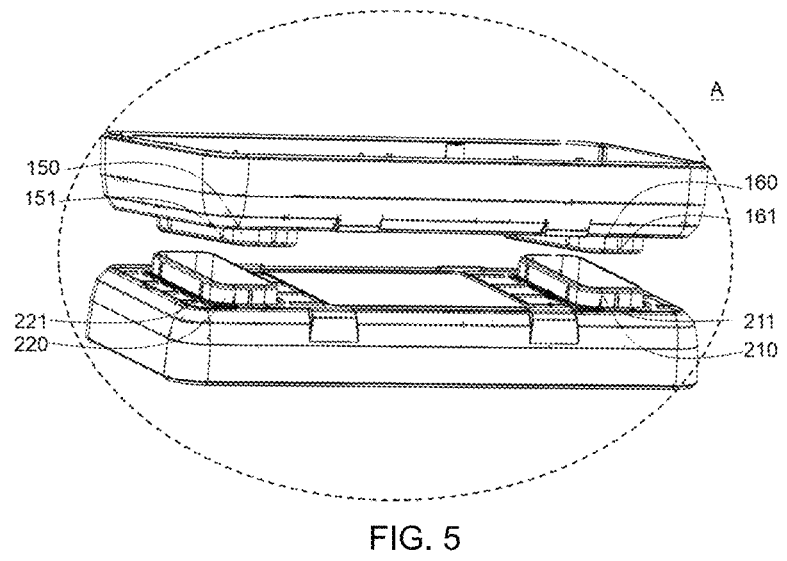
FIG. 5 illustrates a structural schematic diagram of a detachable connection portion between the storage unit and a drying unit in FIG. 1.

During active drying, the storage unit 100 is placed on a bearing surface 202 of the drying unit 200. Correspondingly, the bottom 1135 may be equipped with a first air outlet 150 and a first air inlet 160, which couple with the bearing surface 202 of the drying unit 200. The housing 110 may be detachably connected to the drying unit 200 through the first air outlet 150 and the first air inlet 160. FIG. 5 is a partial enlarged view of the dashed-line part A in FIG. 1, illustrating the structure of the detachable connection between the storage unit 100 and the drying unit 200. As described above, the internal air within the housing 110 may be exchanged with the external air outside the housing 110 through the first air outlet 150 and the first air inlet 160. The drying unit 200 may also heat the internal air within the housing 110 through the first air outlet 150 and the first air inlet 160.

Specifically, the first air outlet 150 may couple with the second air inlet 220 of the drying unit 200 to allow the drying unit 200 to export the internal air from the housing 110. Meanwhile, the first air inlet 160 may couple with the second air outlet 210 on the drying unit 200, enabling the drying unit 200 to introduce external air into the internal space of the housing 110. Here, internal air refers to the air remaining within the housing, while external air refers to the air from outside the housing.

The internal air within the housing 110 may be dry or humid. When the internal air is dry, the external environment's air is relatively humid. After prolonged infiltration, the internal air changes from dry to humid. In this scenario, a user may conduct active drying to the storage unit 100. To this end, the user may assemble the storage unit 100 and the drying unit 200 together and activate the drying unit 200. The drying unit 200 exports the humid internal air from the housing 110 through the first air outlet 150 and the second air inlet 220 and imports dry external air into the storage unit 100 through the second air outlet 210 and the first air inlet 160.

When the internal air is humid, the external air is relatively dry. After prolonged infiltration, the internal air changes from humid to dry. In this scenario, the user may actively moisturize the storage unit 100. To this end, the user may assemble the storage unit 100 and the drying unit 200 together and activate the drying unit 200. The drying unit 200 exports the dry internal air from the housing 110 through the first air outlet 150 and imports humid external air into the storage unit 100 through the first air inlet 160.

Consequently, through the above operations, the drying unit 200 may regulate the humidity of the internal air within the storage unit 100.

It should be noted that dry air and humid air are relative concepts. Dry air refers to air with relatively low humidity, while humid air refers to air with relatively high humidity. In a 3D printing scenario, the primary role of this modular storage device 10 is to maintain the dryness of 3D printing filaments.

As shown in FIG. 5, to couple with the drying unit 200, a coupling mechanisms may be set on the first air outlet 150 and the second air inlet 220. The coupling mechanisms may be designed in various ways. For example, the first air outlet 150 of the storage unit 100 may have a first slot 151, while the second air inlet 220 on the drying unit 200 may have a first hook 221. a coupling mechanisms may also be respectively set on the first air inlet 160 and the second air outlet 210. The coupling mechanisms may be designed in various ways. For instance, the first air inlet 160 may have a second slot 161, and correspondingly, the second air outlet 210 on the drying unit 200 may have a second hook 211. Consequently, when the housing 110 and the drying unit 200 are assembled together, the housing 110 may couple with the drying unit 200 by engaging the first slot 151 on the first air outlet 150 with the first hook 221 on the second air inlet 220, and by engaging the second slot 161 on the first air inlet 160 with the second hook 211 on the second air outlet 210, thereby achieving the coupling between the housing 110 and the drying unit 200.

In addition to the hook-and-slot coupling, the housing 110 and the drying unit 200 may also adapt other means of coupling structure, such as magnetic coupling, bolt coupling, etc.

When the storage unit 100 is assembled with the drying unit 200, the drying unit 200 may actively regulate the humidity of the housing 110. When the storage unit 100 is separated from the drying unit 200, the storage unit 100 may passively maintain the humidity of the internal air. This requires sealing the first air outlet 150 and the first air inlet 160.

To seal the first air outlet 150, an air outlet cover is provided on the first air outlet 150 (not shown in the figure). The air outlet cover may be in an open or closed state. When the first slot 151 on the first air outlet 150 engages with the first hook 221 on the drying unit 200, the air outlet cover opens, and the first air outlet 150 is in an open state to let the internal air flow out. When the first slot 151 on the first air outlet 150 disengages from the first hook 221 on the drying unit 200, the air outlet cover closes to seal the first air outlet 150, and the first air outlet 150 is in a closed state to cut off the internal air from flowing out. It should be noted that the air outlet cover and the first air outlet 150 may be independent of each other. For instance, the housing 110 may include an independent air outlet cover. The air outlet cover and the first air outlet 150 may also be connected via hinges and spring mechanisms or through flexible connections made of elastic materials, without limitation.

To seal the first air inlet 160, an air inlet cover is also provided on the first air inlet 160 (not shown in the figure). The air inlet cover may be in an open or closed state. When the second slot 161 on the first air inlet 160 engages with the second hook 211 on the drying unit 200, the air inlet cover opens, and the first air inlet 160 is in an open state to let the external air flow into the storage unit 100. When the second slot 161 on the first air inlet 160 disengages from the second hook 211 on the drying unit 200, the air inlet cover closes to seal the first air inlet 160, and the first air inlet 160 is in a closed state to cut off the external air from flowing in. It should be noted that the air inlet cover and the first air inlet 160 may be independent of each other. For example, the housing 110 may include an independent air inlet cover. The air inlet cover and the first air inlet 160 may also be connected via hinges and spring mechanisms or through flexible connections made of elastic materials, without limitation.

Under normal circumstances, target objects, such as 3D printing filaments coiled on a filament spool, need to be placed in the storage unit 100. During use, the filament spool, along with the storage unit 100, is installed on a 3D printer to keep the dryness (humidity) of the filament spool constant, facilitating the transport of filament to the 3D printer. This requires that the filament spool be fixed in position within the housing 110 and meanwhile keep being rotatable to feed the filament to the 3D printer.

As shown in FIG. 3, in addition to sidewalls 113, the housing 110 may also include a positioning mechanism 114 set between the first sidewall 1131 and the second sidewall 1132. The positioning mechanism 114 may be used to constrain/limiting the movement of the filament spool within the housing 110 between the third sidewall 1133 and the fourth sidewall 1134 while allowing rotational connection with the filament spool. For instance, the positioning mechanism 114 may be set at the center of the internal space of the housing 110, between the middle part of the first sidewall 1131 and the middle part of the second sidewall 1132. It may also be set at the bottom of the internal space of the housing 110, between the middle part of the first sidewall 1131 and the lower part close to the bottom 1135 of the second sidewall 1132. It may also be set at both the center and bottom of the internal space of the housing 110.

When the positioning mechanism 114 is set at the bottom of the internal space of the housing 110, as shown in FIG. 3, the positioning mechanism 114 may include N positioning rods 1141, where N is a natural number greater than or equal to 1. One end of each of the N positioning rods 1141 is connected to the first sidewall 1131, and the other end is connected to the second sidewall 1132. In the structure shown in FIG. 3, N=2. Each of the N positioning rods 1141 is parallel to an axial direction of the filament spool and may be arranged along the outer edge of the filament spool. This way, these N positioning rods may support the filament spool from the bottom. Furthermore, each of the positioning rods 1101 may be designed as a roller, which means that each positioning rod 1101 may rotate. When the filament spool rotates, the N positioning rods 1141 in contact with the outer edge of the filament spool also rotate with the filament spool, preventing the filament spool from rolling due to friction between the positioning rods 1101 and the filament spool, thereby preventing movement between the third side wall 1133 and the fourth side wall 1134 inside the housing 110.

The fixation of the N positioning rods 1141 may be achieved through sliding track fixation or bracket fixation. When the N positioning rods 1141 are fixed through sliding track fixation, multiple sliding tracks may be respectively set on the first sidewall 1131 and the second sidewall 1132 along the vertical direction. Each sliding track may be coupled to a corresponding end of a corresponding positioning rod 1101. When a positioning rod 1141 is placed in the internal space of the housing 110, one end of the positioning rod 1101 may slide down along the sliding track on the first sidewall 1131, and the other end of the positioning rod 1141 may slide down along the sliding track on the second sidewall 1132. When the positioning rod 1101 reaches a preset working position, it is blocked by the sliding track to stop sliding downward. The coupling structure between the sliding tracks and the ends of the positioning rods may be designed in various ways, without specific limitation in this disclosure.

Additionally, the fixation of the N positioning rods 1141 may also be achieved through bracket fixation. This involves pre-setting N positioning rod brackets at the bottom of the housing 110 and placing the N positioning rods 1141 on these brackets to secure them.

It should be noted that the fixation for the N positioning rods 1141 may be achieved through sliding track fixation, bracket fixation, or a combination of both.

As shown in FIG. 3, when the positioning mechanism 114 is set at the center of the internal space of the housing 110, the positioning mechanism 114 may include sliding tracks; it may also include sliding tracks as well as a filament spool shaft 1144 acting as positioning rods. The filament spool shaft 1144 refers to an axle passing through the center axis hole of the filament spool.

The sliding tracks may include a first sliding track 1142 and a second sliding track 1143. The first sliding track 1142 may be set on the first sidewall 1131 and extend along the vertical direction of the housing 110; the second sliding track 1143 may be set on the second sidewall 1132 and extend along the vertical direction of the housing 110. The filament spool shaft 1144 may include a first end and a second end. The first end may slide-couple with the first sliding track 1142; the second end may slide-couple with the second sliding track 1143. A first stopper is set at the lower end of the first sliding track 1142 to prevent the first end of the filament spool shaft 1144 from continuing to slide down the first sliding track 1142; a second stopper is set at the lower end of the second sliding track 1143 to prevent the second end of the filament spool shaft 1144 from continuing to slide down the second sliding track 1143.

The coupling structure of the first sliding track 1142, the second sliding track 1143, and the ends of their corresponding filament spool shaft 1144 may be designed in various ways, with no specific limitation in this disclosure. For example, the first sliding track 1142 and the second sliding track 1143 may be sliding grooves. Both the first sliding track 1142 and the second sliding track 1143 may be equipped with M long ridges and N short ridges, where M is an integer equal to or greater than 2 and N is an integer equal to or greater than 1. The M long ridges are symmetrically distributed on both sides of the N short ridges, and each long ridge in the M long ridges is parallel to each short ridge in the N short ridges, thus forming two U-shaped grooves composed of the M long ridges and the N short ridges together. Furthermore, the M long ridges and the N short ridges on the first sliding track 1142 are set on the first sidewall 1131, while the M long ridges and the N short ridges on the second sliding track 1143 are set on the second sidewall 1132. The quantities of long ridges and short ridges on the first sliding track 1142 may be the same or different.

As described above, the positioning mechanism 114 may include sliding tracks or both sliding tracks and the filament spool shaft 1144. In the case where the positioning mechanism 114 includes both sliding tracks and the filament spool shaft 1144, the filament spool shaft 1144 is first inserted into the center axis hole of the filament spool, and then the filament spool and filament spool shaft 1144 are placed together in the first sliding track 1142 and the second sliding track 1143. Furthermore, the first end of the filament spool shaft 1144 is slidably connected to the first sliding track 1142, and the second end is slidably connected to the second sliding track 1143, with one end of the filament spool shaft 1144 engaged with the U-shaped groove of the first sliding track 1142 and the other end engaged with the U-shaped groove of the second sliding track 1143. In the case where the positioning mechanism 114 includes the sliding tracks alone, the filament spool may be designed with a filament spool shaft. When the filament spool is placed in the sliding tracks, the first end of the filament spool shaft slidably connects with the first sliding track 1142, and the second end slidably connects with the second sliding track 1143, with one end of the filament spool shaft 1144 engaged with the U-shaped groove of the first sliding track 1142 and the other end engaged with the U-shaped groove of the second sliding track 1143. It may be understood that the first sliding track 1142 and the second sliding track 1143 may also be sliding rails, where the filament spool is equipped with corresponding slide blocks, and when the filament spool is placed in the first sliding track 1142 and the second sliding track 1143, the slide blocks on the filament spool slide along the sliding rails.

When the filament spool is placed into the storage unit 100 and mounted on the 3D printer, the filament coiled on the spool is fed into the 3D printer nozzle through a filament feeding mechanism of the 3D printer, thus participating in 3D printing. Therefore, the housing 110 may also include at least one filament outlet 115, where the at least one filament outlet 115 is configured to allow the filament to extend out from the at least one filament outlet 115 when the spool is engaged in printing.

Figure 6:
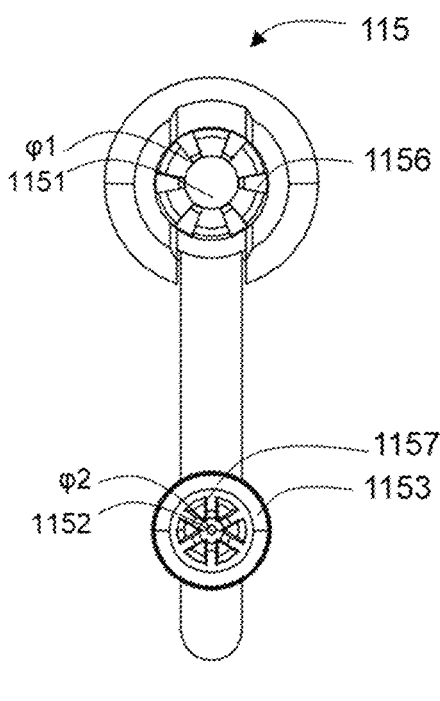
FIG. 6 illustrates a structural schematic diagram of a filament outlet according to some exemplary embodiments of this disclosure.

FIG. 6 illustrates a schematic diagram of the structure of the filament outlet 115 according to some exemplary embodiments of this disclosure. The at least one filament outlet 115 may be set on the sidewall 113 of the housing 110 or on the lid 120.

The filament outlet 115 includes a first outlet 1151 and a second outlet 1152. The first outlet 1151 is equipped with a first outlet cover 1153, and the second outlet 1152 is set on the first outlet cover 1153. Specifically, the first outlet 1151 is configured to allow a first filament with a first diameter $\varphi1$ to pass through, and the second outlet 1152 is configured to allow a second filament with a second diameter $\varphi2$ to pass through. The first diameter $\varphi1$ is greater than the second diameter $\varphi2$; accordingly, the diameter of the first outlet 1151 is greater than the diameter of the second outlet 1153.

The filament outlet 115 is equipped with at least one clamping structure to secure the filament extending out from the at least one filament outlet 115. For example, the diameter of the first outlet 1151 may be slightly smaller than the first diameter $\varphi1$, so that the first outlet may grip the first filament passing through it through friction; similarly, the diameter of the second outlet 1152 may be slightly smaller than the second diameter $\varphi2$, allowing the second outlet to grip the second filament passing through it through friction.

When the filament outlet 115 is made of rigid material, the clamping force of the first outlet 1151 on the first filament comes from the tight fit between the diameter of the first outlet and the first diameter $\varphi1$; the clamping force of the second outlet 1152 on the second filament comes from the tight fit between the diameter of the second outlet and the second diameter $\varphi2$. When both the first outlet 1151 and the second outlet 1152 are made of elastic material, the clamping design (clamping structure) may include a diaphragm structure as shown in FIG. 6. Specifically, the first outlet 1151 may include a first filament hole and multiple slits radiating from the inner edge of the first filament hole, forming multiple diaphragms 1156. This way, when the first filament passes through the first filament hole, the multiple diaphragms slightly deform, thereby gripping the first filament. Similarly, the second outlet 1152 may include a second filament hole and multiple slits radiating from the inner edge of the second filament hole, forming multiple diaphragms 1157.

When the first filament extends out from the first outlet 1151, the first outlet cover 1153 is removed from the first outlet 1151. This puts the first outlet 1151 in an open state, allowing the first filament to extend out from the first outlet 1151 and remain on the first outlet 1151. At this time, the first filament also forms a seal against the first outlet 1151.

The filament outlet 115 may also allow the second filament to extend out from the second outlet 1152. In this case, the first outlet cover 1153 is placed over the first outlet 1151, and the second filament extends out from the second outlet 1152 and remains on the second outlet 1152. At this time, the second outlet cover 1153 seals the first outlet, and the second filament seals the second outlet. It may be understood that due to the larger diameter of the first outlet 1151 compared to the second diameter $\varphi2$ of the second filament, the filament with the second diameter may also extend out from the first outlet 1151 when the spool is engaged in printing. After printing is completed, the first outlet cover 1153 may seal the first outlet 1151 by covering over the first outlet 1151.

As shown in FIG. 3, the filament outlet 115 may also be designed as a third outlet 1154 to allow a third filament with a third diameter $\varphi3$ to extend out of the storage unit 100. It should be noted that the third diameter $\varphi3$ may be greater than or equal to the first diameter $\varphi1$, less than or equal to the second diameter $\varphi2$, or between the first diameter $\varphi1$ and the second diameter $\varphi2$. The diameter of the third outlet 1154 may be slightly smaller than the third diameter $\varphi3$, allowing the third outlet to grip the third filament.

The third outlet 1154 also includes a clamping design (clamping structure). When the third outlet 1154 is made of rigid material, the clamping force of the third outlet 1154 on the third filament comes from the tight fit between the diameter of the third outlet and the third filament. When the third outlet 1154 is made of elastic material, its clamping structure may be designed as a diaphragm structure similar as the ones shown in FIG. 6. The diaphragm structure has been described earlier and will not be reiterated here.

Furthermore, the third outlet 1154 may be equipped with a second outlet cover 1155 connected to the first outlet 1151 and switchable between open and close states. When the second outlet cover 1155 is open, the third filament may extend out from the third outlet 1154 and seal the third outlet 1154. When the second outlet cover 1155 is closed, it seals the third outlet 1154.

Additionally, as shown in FIG. 3, the storage unit 100 includes a desiccant compartment 155, and the desiccant compartment 155 may be non-removably installed within the storage unit 100. Furthermore, a color-changing desiccant 130 may be placed within the desiccant compartment 155, and the color-changing desiccant 130 may be reused, thus remaining in the desiccant compartment 155 without being removed. The color-changing desiccant 130 may absorb moisture from the internal air in the housing 110, thus passively drying the housing 110, and may indicates its moisture content by changing its color. As the color-changing desiccant 130 absorbs moisture from the air, its color changes. When the color of the color-changing desiccant 130 in the desiccant compartment 155 changes to a preset color, it indicates that the color-changing desiccant 130 has absorbed enough moisture and requires active drying by the drying unit 200. Furthermore, when the drying unit 200 dries the air within the housing 110, the color-changing desiccant 130 is also dried. When the color of the color-changing desiccant 130 returns to its original color, it indicates that active drying may be stopped. It should be noted that the color-changing descant 130 may be reusable, i.e., after active drying stops, the color-changing desiccant 130 returns to its original state and color and may continue to passively dry the air within the housing 110.

As shown in FIG. 3, besides the desiccant compartment 155, the storage unit 100 also includes a humidity sensor compartment (not shown). The humidity sensor compartment is used to store a humidity sensor 140. The humidity sensor 140 is configured to indicate the air humidity within the interior space of the housing 110. As the interior of the housing 110 gradually becomes damp, the humidity sensor 140 may detect the air humidity within the interior space of the housing 110. This may facilitate the user to judge the humidity condition of the housing 110 and help the user to determine the timing of active drying. Furthermore, as the drying unit 200 dries the air within the housing 110, the humidity sensor 140 may provide real-time indication of the dryness level within the interior space of the housing 110. As such, the humidity sensor 140 may be used to assess the current humidity conditions of the internal air, while the color-changing desiccant 130 may be used to gauge the remaining passive drying capacity of the housing 110.

As described above, the modular storage device also includes a drying unit 200. The drying unit 200 may be configured to be coupled with the storage unit 100 to dry the internal air within the storage unit 100. As mentioned earlier, during active drying, the drying unit 200 may be coupled to the storage unit 100 via a second air outlet 210 and the first air inlet 160, introducing external air into the interior space of the housing 110. Meanwhile, the drying unit 200 may be coupled to the storage unit 100 via the second air inlet 220 and the first air outlet 150, expelling the internal air from within the housing 110. The specific coupling means have been described earlier and will not be reiterated here.

Figure 7A:
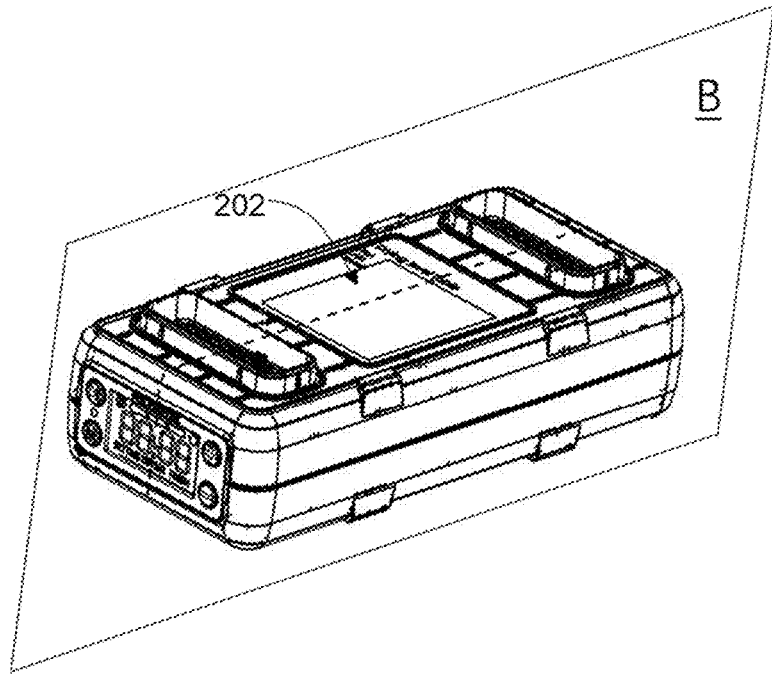
FIG. 7A illustrates a perspective view of the drying unit in the storage device of FIG. 1 according to this disclosure.
Figure 7B:
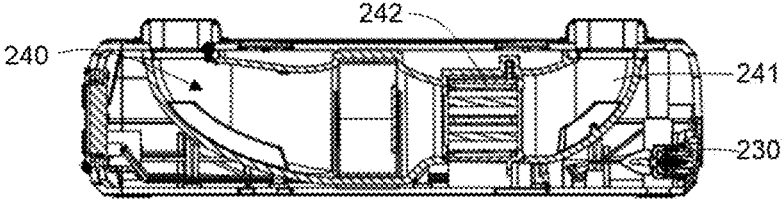
FIG. 7B illustrates a sectional view of the drying unit along the B plane as depicted in FIG. 7A according to this disclosure.

FIG. 7A depicts a perspective view of the drying unit within the storage device as shown in FIG. 1 of the present disclosure; FIG. 7B illustrates a sectional view of the drying unit along the B plane as depicted in FIG. 7A of the present disclosure. As shown in the figures, the drying unit 200 may include a bearing surface 202 for bearing and/or placing the storage unit 100. The bearing surface 202 may include the second air outlet 210 and the second air inlet 220, i.e., the second air outlet 210 and the second air inlet 220 are respectively positioned on the bearing surface 202.

Additionally, the drying unit 200 may further include an air-blowing module 230 and a drying module 240. The drying module 240 may be connected to the second air inlet 220 and the second air outlet 210 and may reduce the relative humidity of the external air passing through it. The air-blowing module 230 may be connected to the drying module 240 and, during operation, may withdraw the internal air of the storage unit 100 through the second air inlet 220 and inject external air into the storage unit 100 through the second air outlet 210.

The drying module 240 may be a heating-type drying module 240, a dehumidification-type drying module 240, or a combination of a heating-type and dehumidification-type drying module.

The heating-type drying module 240 may include a heating wire 242 and an air channel 241. The heating wire 242 may be situated within the air channel 241 and heats the air passing through the air channel 241 to lower the relative humidity of the external air passing through it. The dehumidification-type drying module 240 may include a desiccant unit 242 and an air channel 241. The desiccant unit 242 may include air desiccant and may be placed within the air channel 241 to reduce the relative humidity of the external air passing through it by absorbing moisture from the external air.

It should be noted that reducing the relative humidity of the external air passing through it may be understood as increasing the relative dryness of the external air passing through it. Relative humidity refers to the percentage of water vapor in the air relative to the saturated water vapor at a particular temperature. The saturation of water vapor in the air varies with temperature: hot air may hold more water vapor, while cold air may hold less. Therefore, when the water vapor content of external air remains constant, raising the air temperature will lower relative humidity, indicating drier air; lowering the air temperature will raise relative humidity, indicating more humid air. At this point, reducing the relative humidity of the external air passing through it may be understood as decreasing the humidity of the external air, making it drier. It may also be understood as decreasing the dryness of the external air, thereby making the external air more humid.

The air channel 241 may be fully connected to the second air outlet 210 and the second air inlet 220. The air channel 241 may also be partially connected to the second air outlet 210 and the second air inlet 220, allowing air from the environment surrounding the drying unit 200 to enter the air channel 241. Accordingly, the external air passing through the drying module 240 may come entirely from the internal air of the housing 110, or it may include a combination of internal air and air from the surrounding environment.

The air-blowing module 230 may withdraw the internal air of the housing 110 through the second air inlet 220 and feed it into the air channel 241. Then, the air is dried by the drying module 240 and the external air from the air channel is introduced into the housing 110 through the second air outlet 210. In cases where the air channel 241 is partially connected to the second air outlet 210 and the external environment surrounding the drying unit 200, the air-blowing module 230 may withdraw the internal air of the housing 110 through the second air inlet 220 and introduce air from the external environment into the housing 110 through the second air outlet 210. Furthermore, the air-blowing module 230 may be any device capable of extracting and introducing air, such as a vacuum pump, an air extractor, a negative-pressure blower, and so on.

When the drying module 240 is a heating-type drying module 240, the drying module 240 heats the air withdrawn from the interior space of the housing 110 to elevates the dryness of it, and then introduces the heated air into the interior space of the housing 110 as external air. As the internal space becomes dry, the moisture from the color-changing drying agent 130 and the moisture molecules adhering to the filament spool and 3D printing filament enter the internal air and are extracted by the drying module 240, thereby reducing the moisture content of the color-changing drying agent 130 and the filament spool as well as the 3D printing filament. It is important to note that while most of the heated air from the drying unit 200 comes from the internal air within the housing 110, there is still a small portion of the surrounding environment's air mix with the extracted internal air to form the external air. After a certain period of iteration, the air that previously existed in the internal space before active drying is continuously replaced by the dry environmental air around the drying module 240, thereby removing moisture from the color-changing drying agent 130 and the filament spool as well as the 3D printing filament.

When the drying module 240 is a dehumidification-type drying module 240, the internal air within the internal space of the housing 110, after being extracted, passes through the drying module 240. The drying module 240 may absorb moisture from the passing air, and the dehumidified air, when reintroduced into the storage unit 100, will carry away moisture from the color-changing drying agent 130 and the filament spool as well as the 3D printing filament. This process is repeated in a cycle. Of course, the drying unit 200 may also export the internal air and release it into the surrounding environment, and importing air from the surrounding environment as the external air into the internal space of the housing 110 through the drying module 240, thereby reducing the relative humidity of the external air.

Figure 8:
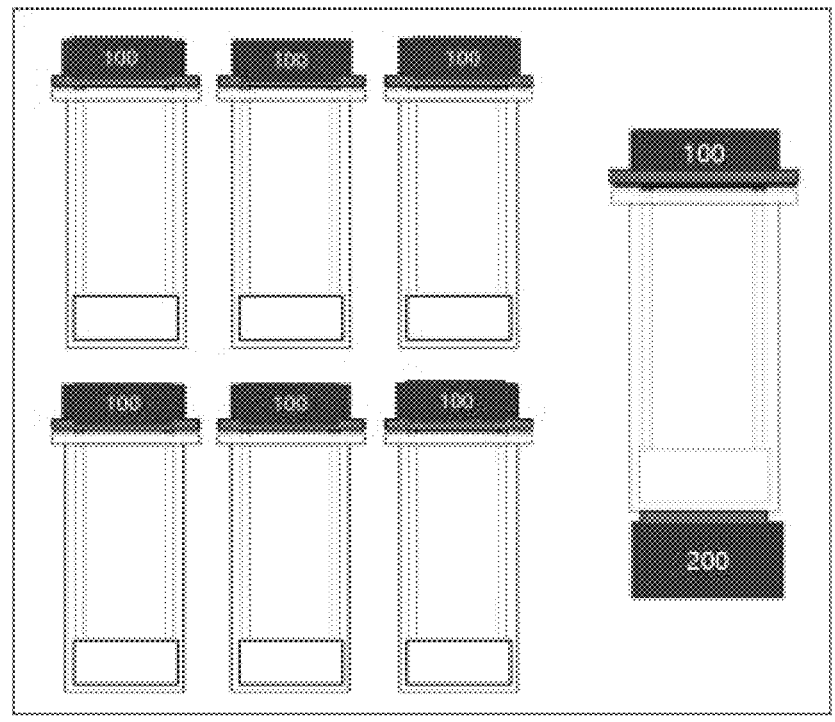
FIG. 8 illustrates a schematic diagram of the composition of the modular storage device according to some exemplary embodiments of this disclosure.

FIG. 8 shows a schematic diagram of the modular storage device according to some exemplary embodiments of this disclosure. The storage unit 100 can serve as a standalone unit for storing the filament spool, or as part of a storage module when assembled together with the drying unit 200 to store the filament spool. The drying unit 200 may accommodate multiple storage units 100, which means that multiple storage units 100 may be installed on the same drying unit 200. The modular design, which separates the storage unit 100 and the drying unit 200, allows a single drying unit 200 to dry multiple storage units 100. The number of storage units 100 in the modular storage unit storage device and the number of drying units 200 may not be the same. Furthermore, the number of storage units 100 may be greater than, equal to, or less than the number of drying units 200.

Figure 9:
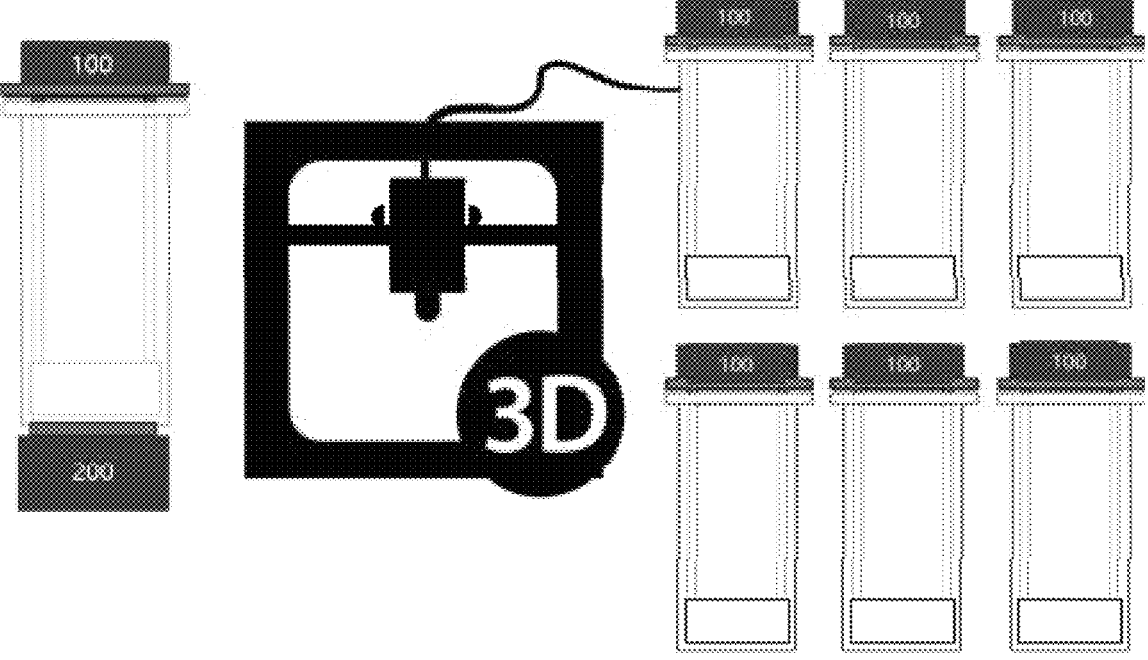
FIG. 9 illustrates a schematic diagram of the modular storage device participating in 3D printing according to some exemplary embodiments of this disclosure.

FIG. 9 shows a schematic diagram of the modular storage device participating in 3D printing according to some exemplary embodiments of this disclosure. As can be seen, the storage unit 100 can be directly connected to the 3D printer to participate in 3D printing when the storage unit 100 serves as a standalone unit for storing the filament. But when the storage unit 100 and the drying unit 200 are assembled together, the filament within the storage unit 100 does not participate in the current printing cycle.

The above description has provided specific embodiments of the present disclosure. Other embodiments are within the scope of the appended claims. In some instances, actions or steps recorded in the claims may be performed in an order different from that in the embodiments and still achieve the desired results. Furthermore, processes depicted in the drawings do not necessarily require specific sequences or continuous order to achieve the desired results. In certain embodiments, multitasking and parallel processing are also possible or advantageous.

In conclusion, after reading the detailed disclosure provided in this specification, those skilled in the art may understand that the foregoing detailed disclosure may be presented by way of example and may not be limiting. Although not explicitly stated here, those skilled in the art may understand that this specification encompasses various reasonable changes, improvements, and modifications to the embodiments. These changes, improvements, and modifications are intended to be within the spirit and scope of the exemplary embodiments of this specification.

Furthermore, some terms in this specification have been used to describe embodiments of this specification. For instance, "an embodiment," "embodiment," and/or "some embodiments" mean that the specific features, structures, or characteristics described in connection with that embodiment may be included in at least one embodiment of this specification. Thus, it may be emphasized and understood that, in various parts of this specification, two or more references to "embodiment" or "an embodiment" or "alternative embodiment" may not necessarily refer to the same embodiment. Moreover, specific features, structures, or characteristics may be appropriately combined in one or more embodiments of this specification.

It should be understood that, in the foregoing description of embodiments of this specification, for the purpose of simplification, various features are combined in a single embodiment, drawing, or description to aid understanding. However, this does not imply that the combination of these features is necessary; those skilled in the art may extract a portion of these features as a separate embodiment when reading this specification. In other words, embodiments in this specification may also be understood as an integration of multiple sub-embodiments. Each sub-embodiment is valid when it contains fewer features than all of the features disclosed in a single preceding disclosed embodiment.

Each patent, patent disclosure, publication of a patent disclosure, and other materials, such as articles, books, manuals, publications, documents, items, etc., cited herein may be incorporated by reference. The entire contents for all purposes are incorporated herein, except for any prosecution history associated therewith, which may be inconsistent with or conflicting with the present document or may have a limiting effect on the broadest scope of the claims. For example, if there is any inconsistency or conflict between the description, definitions, and/or usage of terms associated with any material included and the terms, descriptions, definitions, and/or usage associated with terms in this document, the terms in this document shall prevail.

Lastly, it should be understood that the embodiments of the disclosed disclosure are explanatory of the principles of the embodiments of this specification. Other modified embodiments also fall within the scope of this specification. Thus, the disclosed embodiments are provided as examples and not limitations. Those skilled in the art may implement alternative configurations based on the embodiments in this specification. Therefore, the embodiments of this specification are not limited to embodiments precisely described in the disclosure.

What is claimed is:

1. A modular storage device, comprising a storage unit, wherein the storage unit comprises:

a housing, comprising an internal space to store a target object;

a lid, detachably connected to the box body, wherein the housing comprises a plurality of walls, and at least one of the plurality of walls comprises a first air outlet and a first air inlet, the first air outlet is configured to couple with an independent drying unit to allow the drying unit to withdraw internal air from the internal space, the first air inlet is configured to couple with the drying unit to allow the drying unit to introduce external air into the internal space;

an air outlet cover, provided on the first air outlet and configured to open or close the first air outlet; and an air inlet cover, provided on the first air inlet and configured to open or close the first air inlet.

2. The modular storage device according to claim 1, wherein the modular storage unit meets at least one of the following features:

the first air outlet comprises: a first slot configured to engage with a first hook of the drying unit; or the first air inlet comprises: a second slot configured to engage with a second hook of the drying unit.

3. The modular storage device according to claim 2, wherein when the first slot engages with the first hook, the air outlet cover is opened, when the first slot disengages from the first hook, the air outlet cover is closed to seal the first air outlet; and when the second slot engages with the second hook, the air inlet cover is opened, when the second slot disengages from the second hook, the air inlet cover is closed to seal the first air inlet.

4. The modular storage device according to claim 1, wherein the plurality of walls comprises:

a first sidewall, and a second sidewall opposite to the first sidewall;

a third sidewall, and a fourth sidewall opposite to the third sidewall; and a bottom, wherein the first air outlet and the first air inlet are disposed on the bottom.

5. The modular storage device according to claim 4, further comprising: a positioning mechanism disposed between the first sidewall and the second sidewall, wherein the target object comprises a filament spool, and the positioning mechanism is configured to rotatably connect to the filament spool and limit the filament spool to move within the housing between the third sidewall and the fourth wall.

6. The modular storage device according to claim 5, wherein the positioning mechanism comprises:

a plurality of positioning rods, arranged along an outer edge of the filament spool to support the filament spool, wherein each positioning rod is parallel to an axis of the filament spool with one end connecting to the first sidewall and the other end connected to the second sidewall.

7. The modular storage device according to claim 5, wherein the positioning mechanism further comprises:

the first sidewall comprising a first sliding track extending in a vertical direction of the housing; and the second sidewall comprising a second sliding track extending in the vertical direction; and a filament spool shaft to pass through the filament spool along an axis of the filament spool, wherein the filament spool shaft includes a first end slidably connected to the first sliding track, and a second end slidably connected to the second sliding track.

8. The modular storage device according to claim 7, wherein the first sliding track comprises at least one of a sliding groove or a sliding rail; and the second sliding track comprises at least one of a sliding groove or a sliding rail.

9. The modular storage device according to claim 4, wherein the housing comprises at least one filament outlet; and the at least one filament outlet comprises at least one clamping structure to clamp a filament extending from the filament outlet.

10. The modular storage device according to claim 9, wherein the at least one filament outlet is arranged on at least one of one or more sidewalls of the plurality of walls; or the lid.

11. The modular storage device according to claim 9, wherein the at least one filament outlet comprises:

a first outlet, suitable for a first filament having a first diameter; and a first outlet cover, configured to open or hermitically close the first outlet.

12. The modular storage device according to claim 11, wherein the first outlet cover comprises a second outlet suitable for a second filament having a second diameter, and the first diameter is larger than the second diameter.

13. The modular storage device according to claim 9, wherein the at least one filament outlet comprises:

a third outlet, suitable for a third filament having a third diameter; and a second outlet cover, configured to be open or hermitically close the third outlet.

14. The modular storage device according to claim 1, further comprising:

a reusable color-changing desiccant, disposed in a desiccant compartment of the housing, wherein the color-changing desiccant is configured to dry the housing and indicate a moisture level of the desiccant; and a hygrometer, disposed in a hygrometer compartment of the housing, and configured to indicate air humidity inside the housing.

15. The storage device according to claim 1, further comprising: the drying unit, wherein the drying unit is independent of the storage unit and detachably connected with the storage unit, the drying unit comprising:

a bearing surface, configured to support the storage unit and comprising the second air outlet and the second air inlet;

a drying module, connected to the first air outlet and the second air outlet, and configured to reduce a relative humidity of the external air flowing through the drying module; and an air-blowing module, being connected with the drying module, wherein during operation, the air-blowing module withdraws the internal air from the storage unit through the second air inlet during operation, and injects the external air into the storage unit through the second air outlet.

16. The modular storage device according to claim 1, wherein the lid comprises:

a first engaging edge, the first engaging edge comprising a sealing groove, and a housing sealing member being arranged in the sealing groove; and a second engaging edge, the first engaging edge being configured to be detachably engaged with the second engaging edge.

17. The modular storage device according to claim 1, wherein the lid is hermetically connected to the box body.

18. A modular storage device, comprising:

a drying unit comprising:

a bearing surface, configured to support a storage unit and comprising a second air outlet and a second air inlet;

the second air outlet, configured to couple with a first air inlet of the storage unit, the second air inlet, configured to couple with a first outlet of the storage unit, and an air-blowing module, configured to draw internal air from the storage unit through the second air inlet, and inject external air into the the storage unit through the second air outlet, wherein a second relative humidity of the external air is lower than a first relative humidity of the internal air.

19. The modular storage device according to claim 18, wherein the drying unit further comprises:

a drying module, configured to reduce the second relative humidity of the external air passing through the drying module, wherein the drying module is at least one of a heating-type drying module, or a dehumidification-type drying module.

20. The modular storage device according to claim 19, wherein the drying module further comprises: an air channel, wherein the air channel meets at least one of the following conditions:

the air channel is at least partially connected to the second air outlet and the second air inlet, such that at least part of the internal air flows through the drying module to form at least a part of the external air, or the air channel is at least partially connected to the second air outlet and an external environment of the drying unit, such that air from the external environment flows through the drying module to form at least a part of the external air.

21. The modular storage device according to claim 18, further comprising a storage unit, wherein the storge unit comprises:

a housing, configured to store a target object, wherein the housing comprises a plurality of walls, and at least one of the plurality of walls comprises the first air outlet and the first air inlet; and a lid, detachably connected to the housing.

22. The modular storage device according to claim 21, wherein the storage unit comprises at least one filament outlet; and the at least one filament outlet comprises:

a first outlet, suitable for a first filament having a first diameter; and a first outlet cover, configured to open or close the first outlet.

* * * * *